United States Patent
Smook

(10) Patent No.: US 7,000,779 B2
(45) Date of Patent: Feb. 21, 2006

(54) SEPARATION DEVICE

(75) Inventor: Derk Abel Smook, Appingedam (NL)

(73) Assignee: Bollegraaf Beheer Appingedam B.V., Appingedam (NL)

( * ) Notice: Subject to any disclaimer, the term of this patent is extended or adjusted under 35 U.S.C. 154(b) by 165 days.

(21) Appl. No.: 10/397,683

(22) Filed: Mar. 26, 2003

(65) Prior Publication Data
US 2003/0183561 A1 Oct. 2, 2003

(30) Foreign Application Priority Data
Mar. 26, 2002 (NL) .................................. 1020255

(51) Int. Cl.
B07B 1/14 (2006.01)

(52) U.S. Cl. ...................... 209/660; 209/671; 209/672; 209/673; 209/395; 209/409; 209/410; 209/405

(58) Field of Classification Search .................... None
See application file for complete search history.

(56) References Cited

U.S. PATENT DOCUMENTS
3,306,441 A * 2/1967 Sanders et al. ............. 209/672

* cited by examiner

Primary Examiner—Donald P. Walsh
Assistant Examiner—Jonathan R Miller
(74) Attorney, Agent, or Firm—Ladas & Parry LLP

(57) ABSTRACT

Device for separating fine fractions and coarse fractions from bulk goods, comprising a frame and a screen plane supported by it for supporting the coarse fraction and allowing the fine fraction to pass through, the screen plane being formed by a number of screen disks, that have been arranged in groups and detachably on rotating driven shafts, the shafts on both sides being bearing mounted with bearing ends in first and second bearings on the frame and at at least one end being in driven engagement with driving means, the bearing ends being divided into a shaft member permanent to the shaft and a bearing member bearing mounted in the first and second bearings on the frame, which bearing member inter-engages with the permanent shaft member for co-rotation therewith, wherein in both bearing ends the permanent shaft member and the bearing member can be coupled to each other and can be uncoupled from each other by a movement of the shaft transverse to the main direction of the shaft.

17 Claims, 4 Drawing Sheets

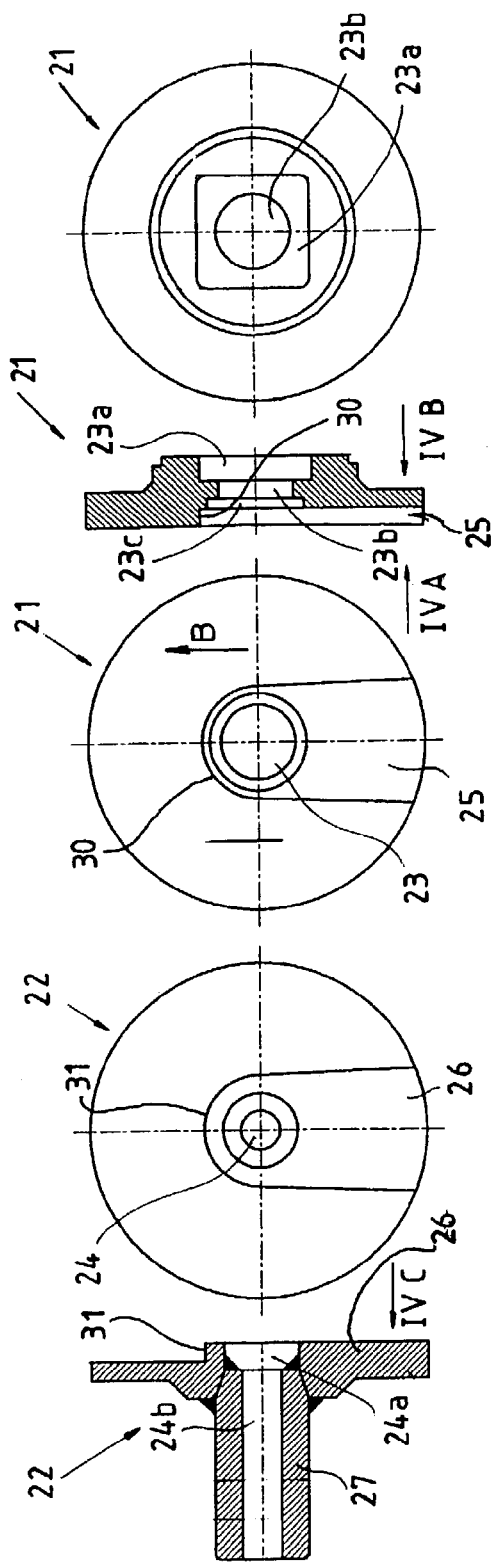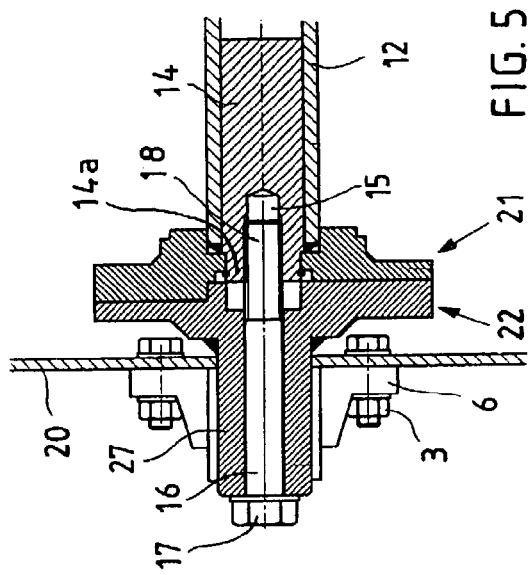

SEPARATION DEVICE

TECHNICAL FIELD

The invention relates to a separation device, enabling to separate fine fractions, such as soil or earth, from coarse fractions, such as tuberous plants.

BACKGROUND OF THE INVENTION

Such separation devices are generally known, and have for instance been described in applicant's Dutch patent application 90.02165. The separation devices comprise a frame in which a number of parallel driven shafts have been bearing mounted, on which shafts star-shaped disks have been arranged, which engage between each other and during rotation, due to the rotating fingers, form a vibrating bed for the material to be treated. In an embodiment the shafts have a flange plate at one shaft end, which flange plate is detachably bolted to a second flange plate having an axle stub extending through the frame plate, which axle stub has been bearing mounted in a bearing and has been provided with a sprocket wheel, which is in engagement with a drive chain or drive belt. At the other shaft end the shaft has been extended with a threaded axle stub, which has been bearing mounted in a bearing attached to the side of a frame plate facing away from the shaft, wherein a pressure ring has been mounted between the shaft and the frame plate. The star-shaped disks have been axially slid on the square shaft and are kept spaced apart by spacer bushes. When replacing the disks or spacer bushes first the flange plates are detached from each other, the threaded axle stub and the bearing at the other shaft end are disassembled, and the shaft is lifted at both ends to be upwardly removed from the device. After removal of the pressure ring the disks and spacer bushes can be slid from the shaft. For the replacing of the disks and bushes situated more towards the flange plate all disks and bushes situated in front of them, at the side of the pressure ring, have to be removed, also when only those disks have to be replaced. The replacement of the disks and/or spacer bushes thus requires a lot of effort and time, particularly considering the large number of shafts (for instance twelve) which then have to be disassembled.

It is an object of the invention to improve on this.

It is a further object of the invention to provide a device of the type mentioned in the preamble, in which the shafts are easy to disassemble.

SUMMARY OF THE INVENTION

From one aspect the invention to that end provides a device for separating fine fractions and coarse fractions from bulk goods, comprising a frame and a screen plane supported by it for supporting the coarse fraction and allowing the fine fraction to pass through, the screen plane being formed by a number of screen disks, that have been arranged in groups and detachably on rotating driven shafts, the shafts on both sides being bearing mounted with bearing ends in first and second bearings on the frame and at at least one end being in driven engagement with driving means, the bearing ends being divided into a shaft member permanent to the shaft and a bearing member bearing mounted in the first and second bearings on the frame, which bearing member inter-engages with the permanent shaft member for co-rotation therewith, wherein in both bearing ends the permanent shaft member and the bearing member can be coupled to each other and can be uncoupled from each other by a movement of the shaft transverse to the main direction of the shaft.

In this way both actual bearings can remain in their places when removing the shaft, as a result of which the disassembling/assembling time is reduced. Because the disks and bushes can be reached from both ends time and effort are further saved on.

Preferably the coupling/uncoupling motion is radial to the shaft, so that the shaft can be removed (or be placed again) in a motion which is as short as possible.

The removal/placement of the shaft is further facilitated when the coupling/uncoupling motion for both bearing ends has the same direction.

In the device according to the invention it is possible due to the use of a coupling connection to provide the bearing members with support surfaces for the shaft members to be coupled therewith, so that also when the connection has not been locked or secured yet (in case of assembling) or when the locking has been loosened (in case of disassembling) the shaft sits stably, leaving the hands free to carry out other (assembly) activities.

Preferably the shaft members and the bearing members have been provided with snugly fitting male and female parts, which preferably are substantially radially oriented and preferably taper in radial direction. The coupling can thus be performed in a simple and reliable manner.

In a further embodiment of the device according to the invention means have been provided for locking the coupling of the permanent shaft member and the bearing member. Preferably the locking means comprise a locking member which extends through the permanent shaft member and the bearing member, and which remains free from the bearings and engages on the shaft. The coupling can thus be released and locked again independent from the bearings. In a preferred embodiment the locking member is a threaded bolt, engaging into a threaded bore permanent to the shaft and supporting with the head on the bearing member. Preferably the shaft is hollow and at the ends has been provided with blocks or pins clamped in there, which blocks or pins have been provided with threaded bores. The shaft can have any desired cross-section, particularly unround, as a result of which the transfer of rotation forces on the disks is enhanced.

BRIEF DESCRIPTION OF THE DRAWINGS

The invention will be elucidated on the basis of an exemplary embodiment shown in the attached drawings, in which:

FIGS. 3A and 3B show vertical cross-sections of two cooperating coupling plates at the ends of the shaft of FIG. 2;

FIGS. 4A–C show views according to arrow IVA and arrow IVB in FIG. 3A and according to arrow IVC in FIG. 3B, respectively;

FIG. 5 shows a bearing of the shaft of FIG. 2; and

DETAILED DESCRIPTION OF THE PREFERRED EMBODIMENT

Figure 1:
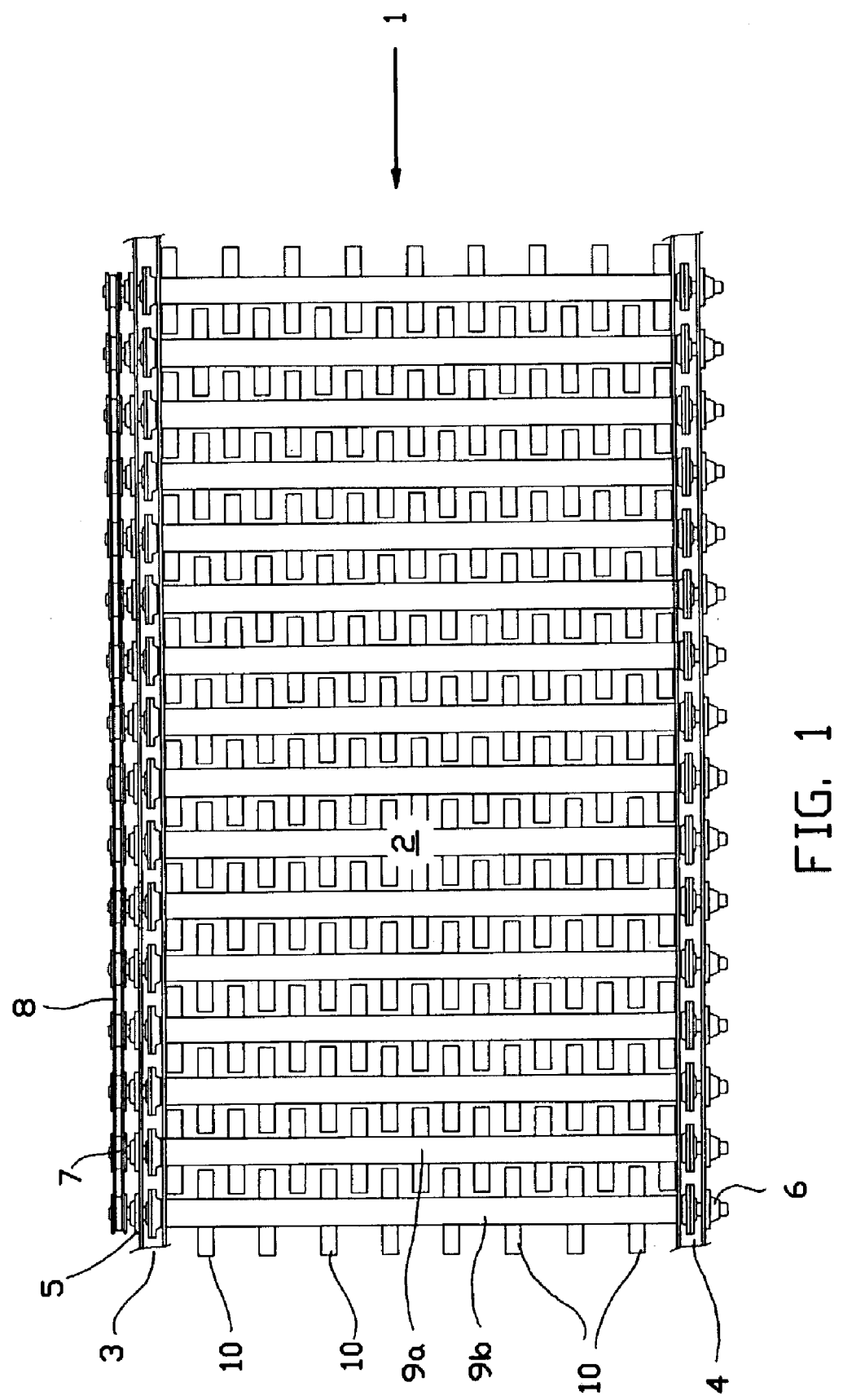
FIG. 1 shows a top view of a part of a preferred embodiment of a separation device according to the invention.

The separation device 1 in FIG. 1 comprises a frame 100 having longitudinal sides 3 and 4, where bearings 5 and 6 have been arranged in which shafts 9a, 9b provided with wheels 10, particularly star-shaped wheels 10, have been bearing mounted. At the side of the bearings 5 sprocket wheels 7 have been attached on the shafts 9a, 9b, which sprocket wheels are in engagement with schematically shown driving means 8, such as one or more chains, which are driven by a motor that is not further shown, to let the shafts 9a, 9b each rotate about their own centre line. In FIG. 1 it can be seen that the wheels 10 of adjacent shafts 9a, 9b have been positioned staggered with respect to each other, so that they are able to engage between each other. The goods/materials to be separated are dumped on the bed formed by the plurality of wheels, after which through rotation of the shafts 9a, 9b the fine fraction is separated from the coarse fraction and can fall down between the wheels. This is a technique known per se.

Figure 2:
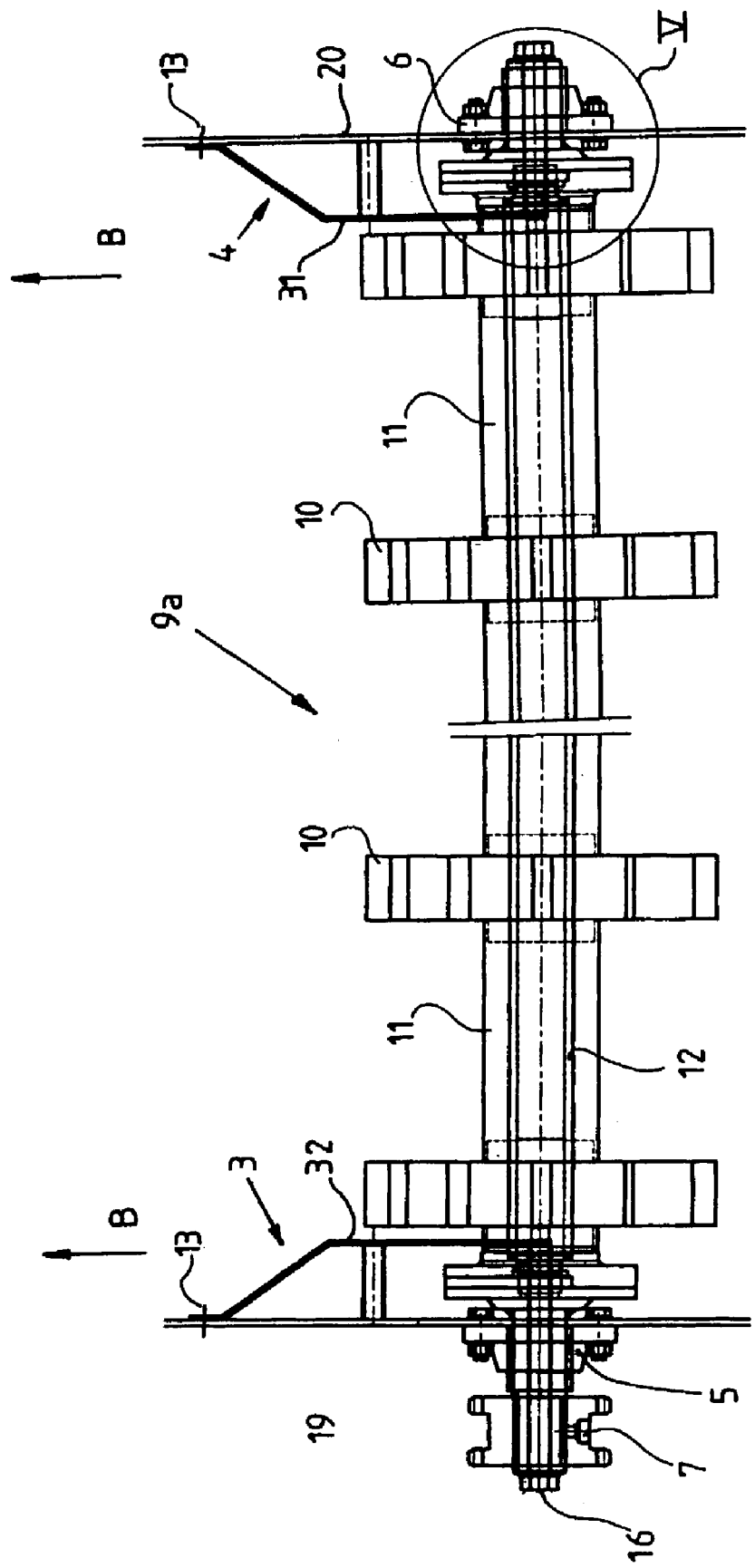
FIG. 2 shows an arrangement of one of the shafts provided with star wheels of the device according to FIG. 1, in horizontal view.

The shaft 9a shown in FIG. 2 comprises a square tube 12 (a solid rod can also be used), onto which a number of wheels 10 have been slid, which are kept spaced apart by spacer tube members 11 that have also been slid onto the tube 12. The ends of the tube 12 extend through partitions 31, 32 which for instance are 1.50 m long (in a direction perpendicular to the plane of the drawing), and by means of bolts 13 have been detachably attached to the side walls 19 and 20 of the longitudinal sides 3 and 4 of the frame 100.

Both ends of the tube 12 have been accommodated in a rotation-fixed manner in first coupling disks 21, shown in FIGS. 3A, 4A and 4B. Said first coupling disks 21 are substantially circular, and have a passage 23, which, as can be seen in FIG. 3A, is stepped, having a square portion 23a, for snug accommodation of an end of the tube 12 (also see FIG. 5), a portion 23b, for fitting accommodation of an end portion 14a of an insert pin or insert block 14 (FIG. 5) yet to be discussed, and a portion 23c in which a locking ring for attachment of the disk 21 on the shaft end can be accommodated. The passage 23 opens into a radial slit or groove 25, which slightly tapers radially to the outside and has a bottom area 30.

In the end of the tube 12, as can be seen in FIG. 5, a pin or block 14 has been placed and welded to it. The pin 14 has a narrowed portion 14a extending outside the end of the tube 12, which portion 14a can be accommodated in the passage portions 23b and 23c mentioned above. The pin 14 has furthermore been provided with a threaded bore 15.

The second coupling disk shown in FIGS. 3B and 4C also is substantially circular, and has a hub bush 27 welded onto it. A bore 24 runs through disk and hub bush, in which bore a broadened portion 24a and a narrower portion 24b can be distinguished. As can be seen in the figures the second coupling disk 22 has been provided with a radial thickening 26, which slightly tapers radially to the outside, to the same degree as recess 25 of the first coupling disk 21, and which forms a support surface 31. The thickening 26 snugly fits in the recess 25, in order to bring the first and second coupling disks into coupling engagement with each other transferring a moment of torque, so that they can form one rotatable unit (see FIG. 5), the bottom end 30 supporting on the support surface 31. Due to the fitting tapering accommodation of thickening 26 in recess 25, support may also be found along the other side areas that diverge from each other.

In FIG. 5 the coupling disks 21 and 22 have been brought into engagement with each other, and the hub bush 27 extends through a hole 40 in wall 20 and has been bearing mounted in bearing portion 41 of bearing 6. From the outside a threaded bolt 16 extends, which with threaded portion 18 has been brought into threaded engagement with the threaded bore 15. The head 17 of threaded bolt 16 abuts the end of the hub bush 27, so that both coupling disks 21, 22 are kept firmly pressed against each other and in axial and radial direction remain together.

A comparable arrangement having first and second coupling plates is present on the left hand side of FIG. 2, although there the hub bush 27' of the second coupling disk 22' will be extended, to offer room to sprocket wheel 7, which will be attached to it in a rotation fixed manner.

Figure 6A:
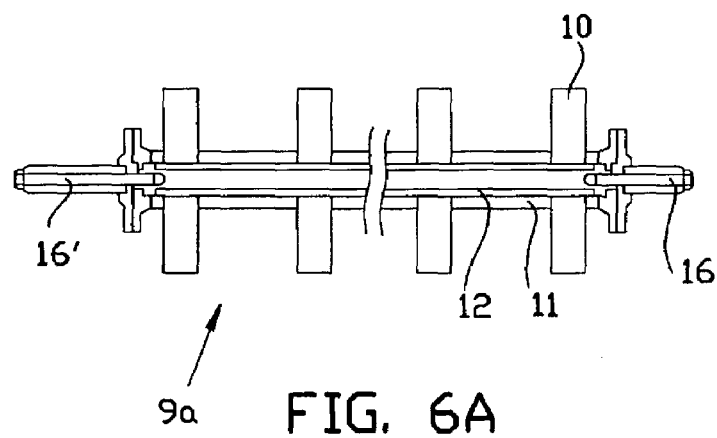
FIGS. 6A–C show consecutive, schematically shown steps in the disassembling of the shaft of FIG. 2.
Figure 6B:
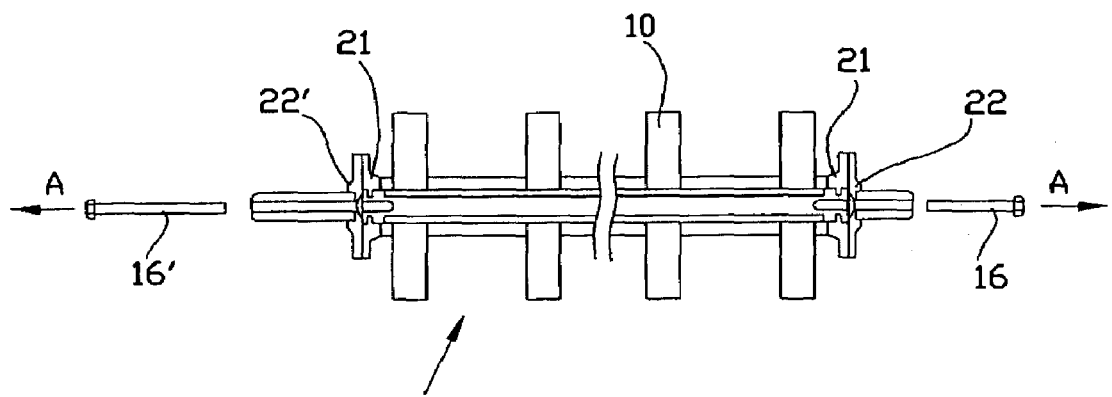
Figure 6C:
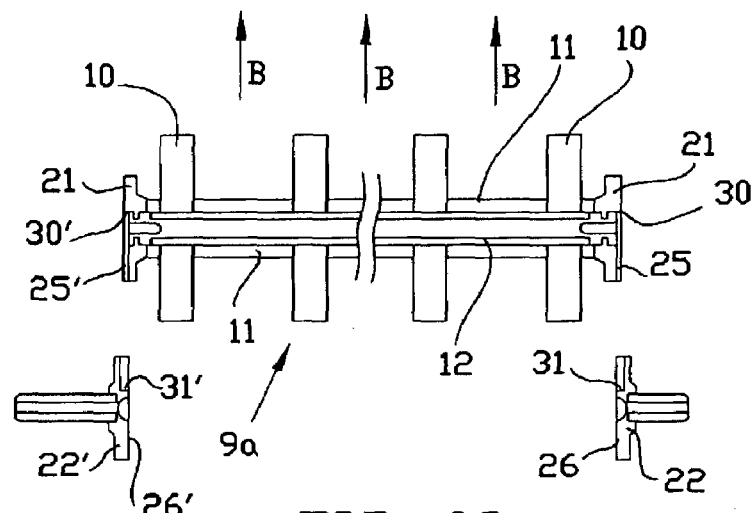

In the FIGS. 6A–C it has been schematically shown how the shaft 9a can be removed in an easy manner, which may be necessary in order to replace wheels 10 by new ones or differently shaped ones, or to replace the spacer bushes 11 by shorter or longer spacer bushes.

To that end first the partitions 31, 32 are removed, which is easy to do by loosening the bolts 13. The coupling disks 21, 22, 22' at both shaft ends are then accessible. It is ensured that the pairs of coupling disks are oriented such that the thickenings 26, 26' face upwards with their upper surface 31, and are substantially vertical. Subsequently the threaded bolts 16, 16' are loosened at both shaft ends and they are removed (direction A), in order to overcome the clamping forces and shearing forces on both coupling disks at each shaft end, see FIG. 6B. Despite the removal of the threaded bolts 16, 16' the shaft 9a will remain sitting stably, because the coupling disks 21, 21' remain resting with the edges (30) of their recesses 25, 25' on the edges (31) of the thickenings 26, 26' of the coupling disks 22, 22'. Both coupling disks 21, 22, 21, 22' can now be removed from each other, by moving the shaft 9a having the first coupling disks 21 at the ends, with respect to the remaining second coupling disks 22, 22' in a direction which is radial and indicated with B in FIGS. 3, 4A and 5. Note that the direction B has also been indicated in FIG. 6C, now upwards, which in connection with the accessibility is easier. As can be seen in FIG. 6C the shaft 9a having the first coupling disk 21 at the ends, can be removed straight upwards, without the bearings 5 and 6 having to be touched while the second coupling disks 22, 22' can remain in their places. After removal of the locking rings the disk 21 in question at the selected shaft end can be removed, and the wanted wheels and/or spacer bushes can be replaced.

The placing again of the shaft 9a takes place in a simple manner in reverse direction, wherein the recess 25 is slid again over the thickening 26 until both coupling disks 21, 22 fit together again, and the shaft 9a is kept stably again by the recesses 25, 25' lying on the thickenings 26, 26'. Thus the hands are then left free to arrange and tighten threaded bolts 16.

What is claimed is:

1. Device for separating fine fractions and coarse fractions from bulk goods, comprising a frame and a screen plane supported by the frame for supporting the coarse fraction and allowing the fine fraction to pass through, the screen plane being formed by a number of screen disks, that have been arranged in groups and detachably supported on rotating driven shafts, the shafts on both sides being mounted with bearing ends in first and second bearings on the frame, at least one bearing end being in driven engagement with driving means, the bearing ends being divided into a shaft member fixed to the shaft and a bearing member mounted in the first and second bearings on the frame, which bearing member inter-engages with the fixed shaft member for co-rotation therewith, wherein in both bearing ends the fixed shaft member and the bearing member can be coupled to each other and can be uncoupled from each other by a movement of the shaft in a direction transverse to the shaft, the bearing members being provided with support surfaces for the shaft members to be coupled therewith, the shaft members and the bearing members being provided with snugly fitting male and female parts having mutually abutting ends facing in opposite directions transverse to the shaft.

2. Device according to claim 1, the coupling/uncoupling movement being radial to the shaft.

3. Device according to claim 1, the coupling/uncoupling movement for both bearing ends having the same direction.

4. Device according to claim 1, the male and female parts being substantially radially oriented.

5. Device according to claim 4, the male and female parts tapering in radial direction.

6. Device according to claim 1, further comprising means for locking the coupling of the fixed shaft member and the bearing member.

7. Device according to claim 6, wherein the locking means comprise a locking member which extends through the fixed shaft member and the bearing member and which, engages the bearing member and, the fixed shaft member.

8. Device according to claim 7, the locking member being a threaded bolt, engaging into a threaded bore in the shaft and a head of the bolt being supported on the bearing member.

9. Device according to claim 8, the shaft being hollow and at the ends provided with pins or blocks clamped therein, which pins or blocks are provided with threaded bores.

10. Device according to claim 1, the drive means being situated axially outside the bearing ends.

11. Device according to claim 1, the screen disks arranged on adjacent shafts being staggered with respect to each other and engaging between each other.

12. Device according to claim 1, the screen disks on the shaft being kept at selected distances from each other by means of spacers that have been slid onto the shaft.

13. Device according to claim 12, the spacers being bushes.

14. Device according to claim 1, wherein at least one of the screen disks is star-shaped and includes a series of radially extending arms.

15. Device according to claim 1, the shaft being unround.

16. Device for separating fine fractions and coarse fractions from bulk goods, comprising a frame and a screen plane supported by the frame for supporting the coarse fraction and allowing the fine fraction to pass through, the screen plane being formed by a number of screen disks, that have been arranged in groups and detachably supported on rotating driven shafts, the shafts on both sides being mounted with bearing ends in first and second bearings on the frame and at at least one end being in driven engagement with driving means, the bearing ends being divided into a shaft member fixed to the shaft and a bearing member mounted in the first and second bearings on the frame, which bearing member inter-engages with the fixed shaft member for co-rotation therewith, wherein in both bearing ends the fixed shaft member and the bearing member can be coupled to each other and can be uncoupled from each other by a movement of the shaft in a direction transverse to a longitudinal direction of the shaft, the bearing members being provided with support surfaces for the shaft members to be coupled therewith, the shaft members and the bearing members being provided with snugly fitting male and female parts substantially oriented in a direction radial to the shaft and tapering in said radial direction.

17. Device according to claim 16 wherein the male part is formed as a thickening on its respective member and the female part is formed as a shaped recess having the same shape as said male part such that the male part snugly fits into the female part when the shaft is moved in said transverse direction to couple the shaft to the bearing members in axial alignment for common rotation therewith.

* * * * *